United States Patent [19]

Schuil

[11] 3,764,554

[45] Oct. 9, 1973

[54] LUMINESCENT ALKALINE EARTH SULFATE PHOSPHOR AND METHOD OF PREPARATION

[75] Inventor: Roelof Egbert Schuil, Emmasingel, Eindhoven, Netherlands

[73] Assignee: U. S. Philips Corporation, New York, N.Y.

[22] Filed: Nov. 13, 1970

[21] Appl. No.: 89,157

[30] Foreign Application Priority Data
Nov. 17, 1969 Netherlands........................ 6917280

[52] U.S. Cl. ............................................ 252/301.45
[51] Int. Cl. ........................... C09k 1/22, C09k 1/04
[58] Field of Search ................................ 252/301.45

[56] References Cited
UNITED STATES PATENTS

| 3,650,976 | 3/1972 | Luckey | 252/301.45 |
| 3,669,897 | 6/1972 | Wachtel | 252/301.45 |

OTHER PUBLICATIONS

Kroger – Some Aspects of the Luminescence of Solids – 1948 pages 291–292.

*Primary Examiner*—A. B. Curtis
*Assistant Examiner*—Mark Bell
*Attorney*—Frank R. Trifari

[57] ABSTRACT

An ultraviolet bivalent europium activated alkaline earth sulfate phosphor useful for low-pressure mercury vapor discharge lamps and cathode-ray tubes.

4 Claims, 2 Drawing Figures

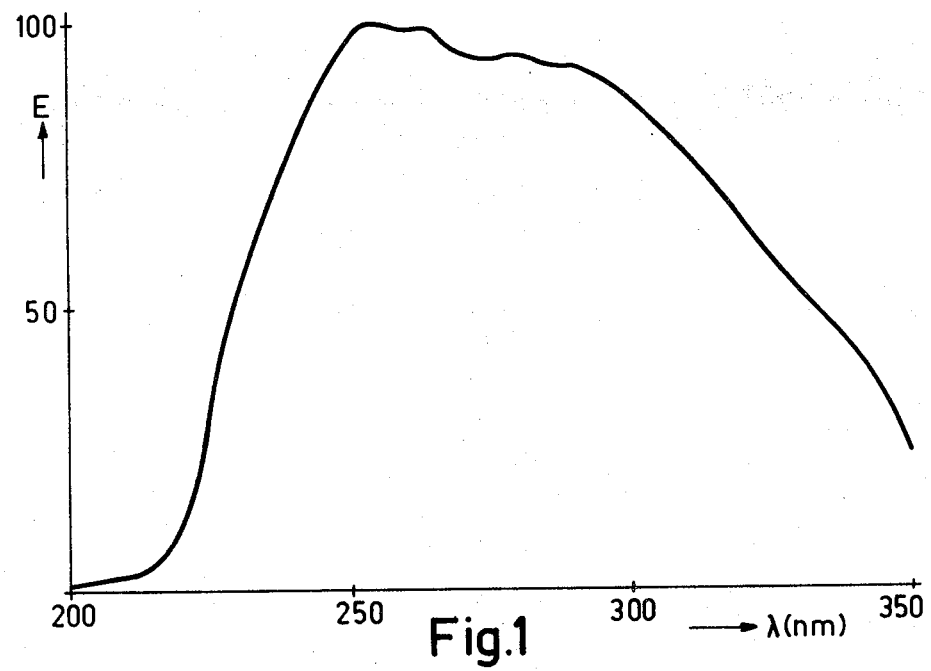
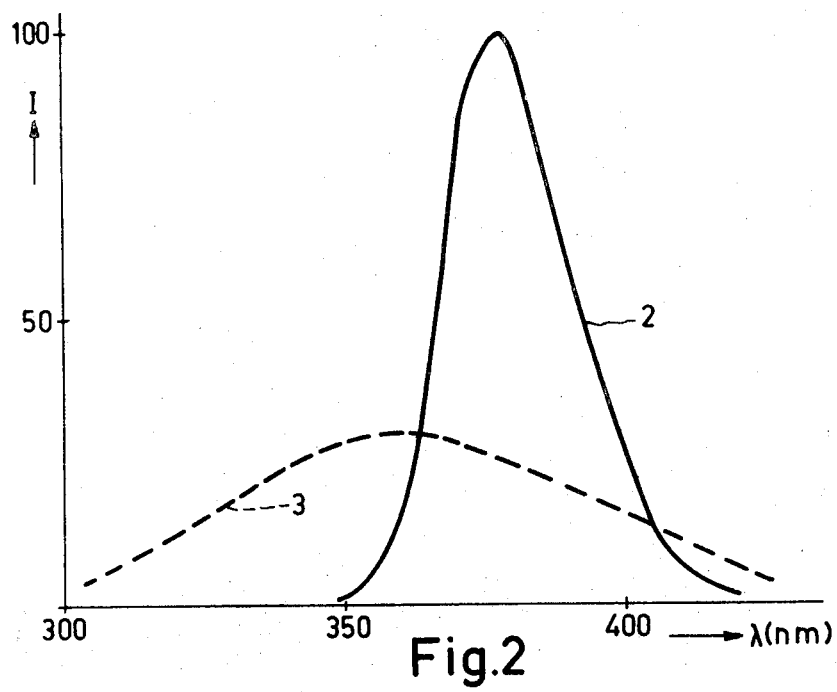

LUMINESCENT ALKALINE EARTH SULFATE PHOSPHOR AND METHOD OF PREPARATION

The invention relates to a luminescent screen comprising a luminescent alkaline earth sulphate. Furthermore, the invention relates to a method of manufacturing such a luminescent alkaline earth sulphate, a low-pressure mercury vapour discharge lamp and a cathode-ray tube provided with such a screen and to the luminescent alkaline earth sulphate itself.

Luminescent materials which emit long-wave ultraviolet radiation are available for some purposes. For example, in photocopy machines it is necessary to use a light source whose spectral distribution corresponds as accurately as possible to the sensitivity of the type of paper to be used. In many cases the paper to be used for this purpose is only sensitive to radiation at wavelengths located in a comparatively narrow spectral range, the maximum sensitivity being found in the long-wave ultraviolet part of the spectrum.

Furthermore, the mentioned luminescent materials are used as an excitation source in so-called double-layer screen. These double-layer screens comprise a first luminescent layer which emits long-wave ultraviolet radiation serving to excite a second luminescent layer. The second luminescent layer which is generally provided on the first layer converts this ultraviolet radiation into visible radiation. Such a double-layer screen may be used in combination with a low-pressure mercury vapour discharge lamp if it is desired to use as a luminescent material emitting visible radiation a material which can better be excited by long-wave ultraviolet radiation than by the radiation generated in the mercury vapour discharge. Furthermore a double-layer screen may advantageously be used in cathode-ray tubes. A condition therefor is that the first luminescent layer which emits ultraviolet radiation can be satisfactorily excited by electrons. A material may then be used in the second luminescent layer which material is much desired in the cathode-ray tube due to its emissive properties and which is satisfactorily excited by long-wave ultraviolet radiation. Such a material is, for example, uranium-activated barium pyrophosphate which itself has a poor electron-ray efficiency.

It is known to use lead-activated luminescent materials for the above-mentioned purposes. An object of the present invention is to provide a luminescent material which emits long-wave ultraviolet radiation and has a higher efficiency and a greater output of ultraviolet radiation than the said lead-activated luminescent materials.

A luminescent screen according to the invention comprises a luminescent alkaline earth sulphate and is characterized in that the luminescent sulphate is defined by the formula $Sr_x Ba_y Ca_z Eu_p^{2+} SO_4$, in which $Eu^{2+}$ represents bivalent europium and in which $$x+y+z+p = 1$$
$$0 \leq x \leq 1$$
$$0 \leq y \leq 1$$
$$0 \leq z \leq 0.75$$

and $$0.001 \leq p \leq 0.20.$$

A luminescent sulphate according to the invention comprises a bivalent europium-activated strontium- and/or barium-sulphate, in which strontium may be partly replaced by calcium and can be satisfactorily excited by electrons and by short-wave ultraviolet radiation, for example, the radiation emitted by a low-pressure mercury vapour discharge. These sulphates show an emission invisible to the eye and have a spectral distribution comprising a narrow band at a maximum of approximately 375 nm.

The activation of alkaline earth sulphates by trivalent europium is known and gives rise to luminescent materials having an orange-red emission. Considering the great differences in the chemical and physical properties of the bivalent and trivalent europium ions, it was by no means self-evident that the activation of alkaline earth sulphates by bivalent europium would lead to efficient materials emitting ultraviolet radiation. Furthermore U.S. Pat. No. 2,372,071 describes magnesium sulphate activated by bivalent europium which emits in the blue part of the visible spectrum.

If in the above-mentioned formula for the luminescent sulphates according to the invention both $y$ and $z$ are equal to zero, strontium sulphate activated by bivalent europium is obtained. This strontium sulphate has a very high quantum efficiency upon excitation by ultraviolet radiation having a wavelength of 254 nm, namely approximately 75 percent for materials having an optimum europium content $p$. The electron-ray efficiency is approximately 8 percent which is high for an oxidic luminescent material.

If both $x$ and $z$ in the above-mentioned formula are equal to zero, barium sulphate activated by bivalent europium is obtained which upon excitation by radiation having a wavelength of 254 nm has a lower quantum efficiency than strontium sulphate, namely approximately 54 percent. The electron-ray efficiency of barium sulphate is approximately 4 percent.

The calcium content $z$ must be chosen to be not more than 0.75, because at higher values of $z$ luminescent substances are obtained which are less useful in practice. Preferably the calcium content $z$ is chosen to be zero.

It has surprisingly been found from experiments that for strontium-barium sulphates according to the invention, where, $y$ has a value between 0.05 and 0.20, greater outputs of ultraviolet radiation are obtained than with pure strontium sulphate. This could by no means be expected because pure barium sulphate has a lower light output than strontium sulphate. For any value of $x$ and $y$ between 0 and 1 mixed crystals of strontium barium sulphate may be obtained, no separate phases of strontium sulphate or barium being formed.

The value for $p$ in the above-mentioned formula is to be chosen within the above given limits. However, europium contents $p$ of between 0.01 and 0.08 are preferred because the greatest light output and the highest electron-ray efficiency are achieved.

The luminescent sulphate according to the invention may be manufactured by means of commonly known methods of manufacturing luminescent materials. For example, it is possible to start from a dry mixture of alkaline earth carbonate, ammonium sulphate and europium trioxide. This mixture is heated at a temperature of between 800° and 1,200°C in a closed crucible for 1 to 5 hours. During the reaction then taking place the alkaline earth sulphate is formed, the europium being incorporated in the lattice. A drawback of this method is that part of the europium remains present in a trivalent state. It is therefore better to start from a mixed carbonate in which europium already occurs in a bivalent form, for example, $Ba_{1-p}Eu_p^{2+}CO_3$.

A method is preferred in which a reducing agent is used. For this purpose the known Jones reducer may be used. This consists of a column filled with amalgamated zinc grains. The starting material is a soluble alkaline earth salt and a soluble europium salt the anion of which salts is not reduced by zinc, for example, alkaline earth chloride and europium chloride. These salts are dissolved in water and the solution is passed through the reducer, the trivalent europium ions then being reduced in accordance with: $Zn + 2Eu^{3+} \rightarrow Zn^{2+} + 2Eu^{2+}$. The liquid flowing from the reducer is added to a diluted sulphuric acid solution so that the desired bivalent europium activated alkaline earth sulphate precipitates. The sulphuric acid solution may comprise a small quantity of picric acid which enhances precipitation. The precipitate is filtered off, washed and dried. The product thus obtained already has luminescent properties. However, the luminescence may considerably be improved by firing the product from 1 to 5 hours in a closed crucible at a temperature of $800° - 1,200°C$. During this firing treatment, lattice faults of the crystals are corrected so that better crystallized material is obtained.

Alternatively, after filtering off, washing and drying, the precipitate may be mixed with 0.5 to 200 percent by weight of NaCl under the conditions mentioned above takes place. This manner of firing is sometimes preferred because not only a correction of the lattice faults occurs in this case, but also the size of the individual crystals is increased. The mean crystal size of the precipitate which without the addition of NaCl substantially does not change during firing is approximately 2 $\mu$. By firing in the presence of NaCl in which the alkaline earth sulphates are satisfactorily soluble this mean crystal size may be increased considerably. Dependent on the firing conditions and the quantity of NaCl used, a mean crystal size of 20 $\mu$ and more may be achieved.

The luminescent sulphate according to the invention is particularly suitable for use in low-pressure mercury vapour discharge lamps, for example, for photocopy machines or in such lamps provided with a double-layer screen. It is advantageous that the maximum of the excitation spectrum of the sulphate substantially coincides with the maximum emission of a low-pressure mercury vapour discharge (principally radiation at a wavelength of 254 nm).

Since the luminescent sulphates according to the invention have an eminent electron-ray efficiency they may advantageously be used in cathode-ray tubes, particularly in cathode-ray tubes having a double-layer screen.

In order that the invention may be readily carried into effect, it will now be described in detail by way of example with reference to a table, an example and a drawing.

TABLE

| Example | Formula | relative radiation output at 254 nm. exc. |
|---|---|---|
| 1 | $Sr_{0.998}Eu_{0.002}SO_4$ | 51 |
| 2 | $Sr_{0.99}Eu_{0.01}SO_4$ | 106 |
| 3 | $Sr_{0.98}Eu_{0.02}SO_4$ | 114 |
| 4 | $Sr_{0.96}Eu_{0.04}SO_4$ | 115 |
| 5 | $Sr_{0.92}Eu_{0.08}SO_4$ | 103 |
| 6 | $Sr_{0.84}Eu_{0.16}SO_4$ | 70 |
| 7 | $Sr_{0.93}Ba_{0.05}Eu_{0.02}SO_4$ | 120 |
| 8 | $Sr_{0.905}Ba_{0.075}Eu_{0.02}SO_4$ | 133 |
| 9 | $Sr_{0.88}Ba_{0.10}Eu_{0.02}SO_4$ | 132 |
| 10 | $Sr_{0.83}Ba_{0.15}Eu_{0.02}SO_4$ | 131 |
| 11 | $Sr_{0.78}Ba_{0.20}Eu_{0.02}SO_4$ | 104 |
| 12 | $Sr_{0.68}Ba_{0.30}Eu_{0.02}SO_4$ | 101 |
| 13 | $Ba_{0.99}Eu_{0.01}SO_4$ | 86 |
| 14 | $Ba_{0.68}Ca_{0.30}Eu_{0.02}SO_4$ | 113 |
| 15 | $Ba_{0.38}Ca_{0.60}Eu_{0.02}SO_4$ | 100 |
| 16 | $Ba_{0.28}Ca_{0.70}Eu_{0.02}SO_4$ | 80 |
| 17 | $Sr_{0.28}Ca_{0.70}Eu_{0.02}SO_4$ | 66 |
| 18 | $Sr_{0.38}Ca_{0.60}Eu_{0.02}SO_4$ | 86 |
| 19 | $Sr_{0.78}Ca_{0.20}Eu_{0.02}SO_4$ | 115 |
| 20 | $Sr_{0.31}Ba_{0.335}Ca_{0.335}Eu_{0.02}SO_4$ | 108 |
| 21 | $Sr_{0.88}Ba_{0.05}Ca_{0.05}Eu_{0.02}SO_4$ | 115 |

EXAMPLE

A solution of 0.1 mol $SrCO_3$ and 0.001 mol $Eu_2O_3$ in approximately 90 cc of 20 percent hydrochloric acid was made. The solution was neutralized with ammonia until it still showed an acidic reaction. This neutralized solution was passed through a reducer containing amalgamated zinc grains, whereby the trivalent europium ions were reduced. The solution flowing from the reductor was applied to 100 cc of 15 percent sulphuric acid so that a precipitate of strontium sulphate activated by europium was produced. The precipitate was filtered, washed with distilled water and dried at a temperature of 120°C. The dried powder was fired for 2 hours at 1,000°C in a closed alundum crucible.

The luminescent strontium sulphate thus obtained is included in the above-mentioned table as Example 3. Upon excitation by radiation at a wavelength of 254 nm this sulphate has a quantum efficiency of 75 percent and a relative radiation output of 114. The relative radiation output is stated in arbitrary units. The relative radiation output of the known lead-activated strontium barium magnesium silicate which is 95 in these units may serve for the purpose of comparison.

The other luminescent sulphates according to the invention which are shown as examples in the table are manufactured in an entirely analogous manner as shown in the above-mentioned example. The relative radiation output is measured upon excitation by radiation at a wavelength of 254 nm and is mentioned in the table for each example. It is found from these measurements that when partly replacing strontium by barium in a strontium sulphate according to the invention, radiation outputs can be obtained which are considerably higher than the radiation output of bivalent europium-activated strontium sulphate itself.

In the drawing FIG. 1 shows the excitation spectrum of the luminescent sulphates according to the invention. The wavelength λ is plotted in nm on the horizontal axis and the relative radiation output E is plotted in arbitrary units on the vertical axis. The maximum of the excitation spectrum is fixed at 100. The figure shows that the location of the maximum of the excitation spectrum substantially coincides with the location of the maximum emission of a low-pressure mercury vapour discharge (254 nm resonance radiation).

FIG. 2 of the drawing shows the spectral distribution of the emitted radiation of the sulphates according to the invention upon excitation by radiation at a wavelength of 254 nm. The wavelength λ is plotted in nm on the horizontal axis and the radiation intensity I is plotted in arbitrary units on the vertical axis. The maximum intensity is fixed at 100. The curve 2 shown in the Figure is measured on the sulphate according to example 3 of the table. The other sulphates according to the invention have a spectral distribution which corresponds to curve 2 if their maximum emission is likewise fixed at 100. For the purpose of comparison FIG. 2 shows the broken-line curve 3 which represents the spectral distribution of the known lead-activated strontium barium magnesium silicate. It is clearly evident that the spectral distribution of sulphates according to the invention is much narrower than that of the known silicate and that considerably higher peak values and higher radiation outputs are achieved.

Finally it is to be noted that pure calcium sulphate also has luminescent properties when activated by bivalent europium. In that case, however, only low relative radiation outputs are achieved. Calcium sulphate activated by bivalent europium may be obtained by precipitation as described for the luminescent sulphates according to the invention. The precipitated calcium sulphate has a light blue emission when excited by ultraviolet radiation. After firing the precipitate it is found that the emission has shifted to the ultraviolet part of the spectrum. The luminescent sulphates according to the invention, however, have the same emission prior to and after firing.

What is claimed is:

1. An ultraviolet luminesent alkaline earth sulfate phosphor of the formula:

$$Sr_xBa_yEu_p{}^{2+}SO_4$$

wherein $x + y + p = 1$ $$0.05 \quad y \quad 0.20$$
$$0.001 \quad p \quad 0.20.$$

2. The phosphor of claim 1 wherein $0.01 \quad p \quad 0.08$.

3. A method of manufacturing an ultraviolet luminescent alkaline earth sulfate phosphor of the formula:

$$Sr_xBa_yCa_zEu_p{}^{2+}SO_4$$

in which $Eu^{2+}$ represents bivalent europium and in which $$x + y + z + p = 1$$
$$0 \quad x \quad 1$$
$$0 \quad y \quad 1$$
$$0 \quad z \quad 0.75$$

and $0.001 \quad p \quad 0.20$ comprising dissolving in water at least one alkaline earth salt selected from the group consisting of water-soluble strontium, calcium and barium salts together with a water-soluble europium salt, the anions of said salts being non-reducible by zinc, passing the resultant solution through a column of amalgamated zinc, then adding said solution to diluted sulfuric acid thereby precipitating the desired bivalent europium-activated alkaline earth phosphate, filtering and washing said precipitate and then heating said precipitate in a closed crucible for 1–5 hours at a temperature of between 800° and 1,200°C.

4. A method as claimed in claim 3, characterized in that the precipitate is heated in the presence of 0.5 – 200 percent by weight of NaCl calculated on the quantity of precipitate.

* * * * *

PO-1050
(5/69)

UNITED STATES PATENT OFFICE
CERTIFICATE OF CORRECTION

Patent No. 3,764,554 (PHN 4434)    Dated October 9, 1973

Inventor(s) ROELOF EGBERT SCHUIL

It is certified that error appears in the above-identified patent and that said Letters Patent are hereby corrected as shown below:

In the title page, "Phillips" should read -- Philips --.

Column 5, line 29 should read -- $0.05 \leq y \leq 0.20$ --.

line 30 should read -- $0.001 \leq p \leq 0.20$ --.

line 31 should read -- 2, The phosphor of claim 1 wherein $0.01 \leq p \leq$ --.

Column 6, line 10 should read -- $0 \leq x \leq 1$ --.

line 11 should read -- $0 \leq y \leq 1$ --.

line 12 should read -- $0 \leq z \leq 0.75$ --.

line 13 should read -- and $0.001 \leq p \leq 0.20$ --.

Signed and sealed this 23rd day of April 1974.

(SEAL)
Attest:

EDWARD M.FLETCHER,JR.
Attesting Officer

C. MARSHALL DANN
Commissioner of Patents